Sept. 28, 1954  E. F. DALY  2,690,093
APPARATUS FOR ASCERTAINING THE ABSORPTION
SPECTRUM OF TRANSLUCENT FLUID SUBSTANCES
Filed March 31, 1952
3 Sheets-Sheet 1
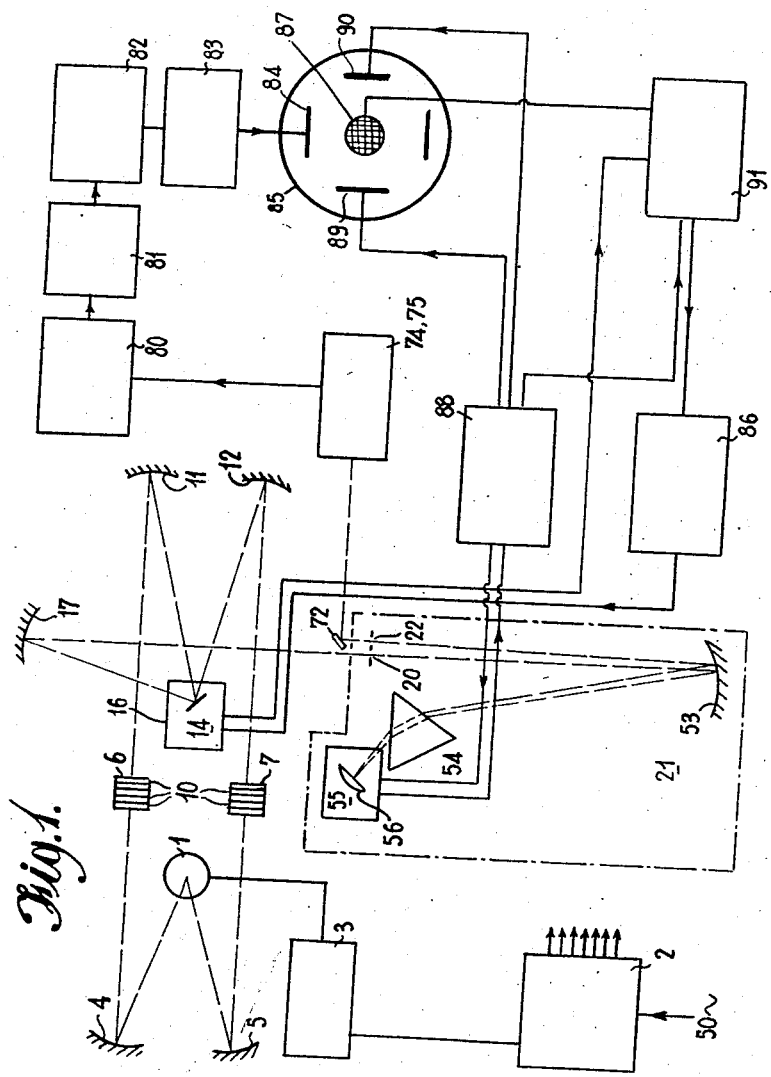
Inventor
Edgar Frank Daly
By Emery Holcombe & Blair
Attorney Sept. 28, 1954  
E. F. DALY  
2,690,093  
APPARATUS FOR ASCERTAINING THE ABSORPTION  
SPECTRUM OF TRANSLUCENT FLUID SUBSTANCES  
Filed March 31, 1952  
3 Sheets-Sheet 2
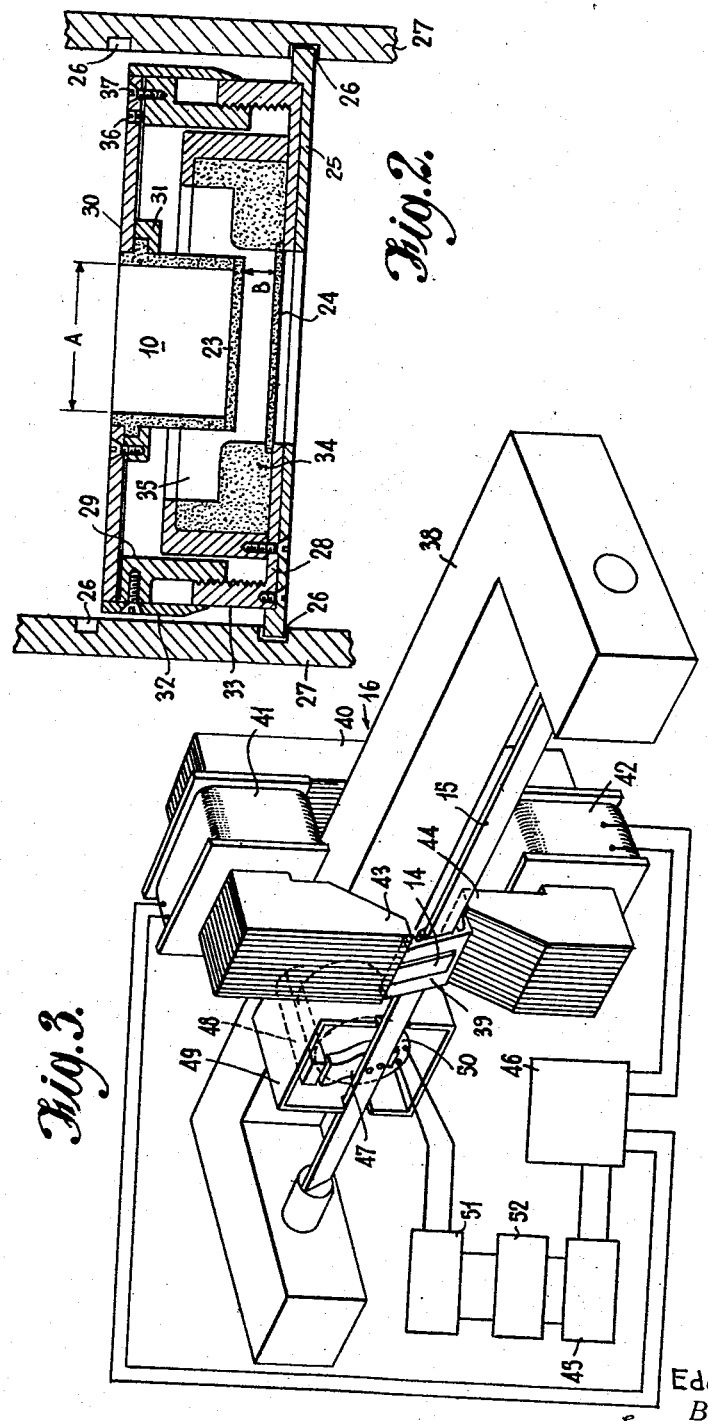
Inventor  
Edgar Frank Daly  
By  
Attorney Sept. 28, 1954  E. F. DALY  2,690,093
APPARATUS FOR ASCERTAINING THE ABSORPTION
SPECTRUM OF TRANSLUCENT FLUID SUBSTANCES
Filed March 31, 1952  3 Sheets-Sheet 3
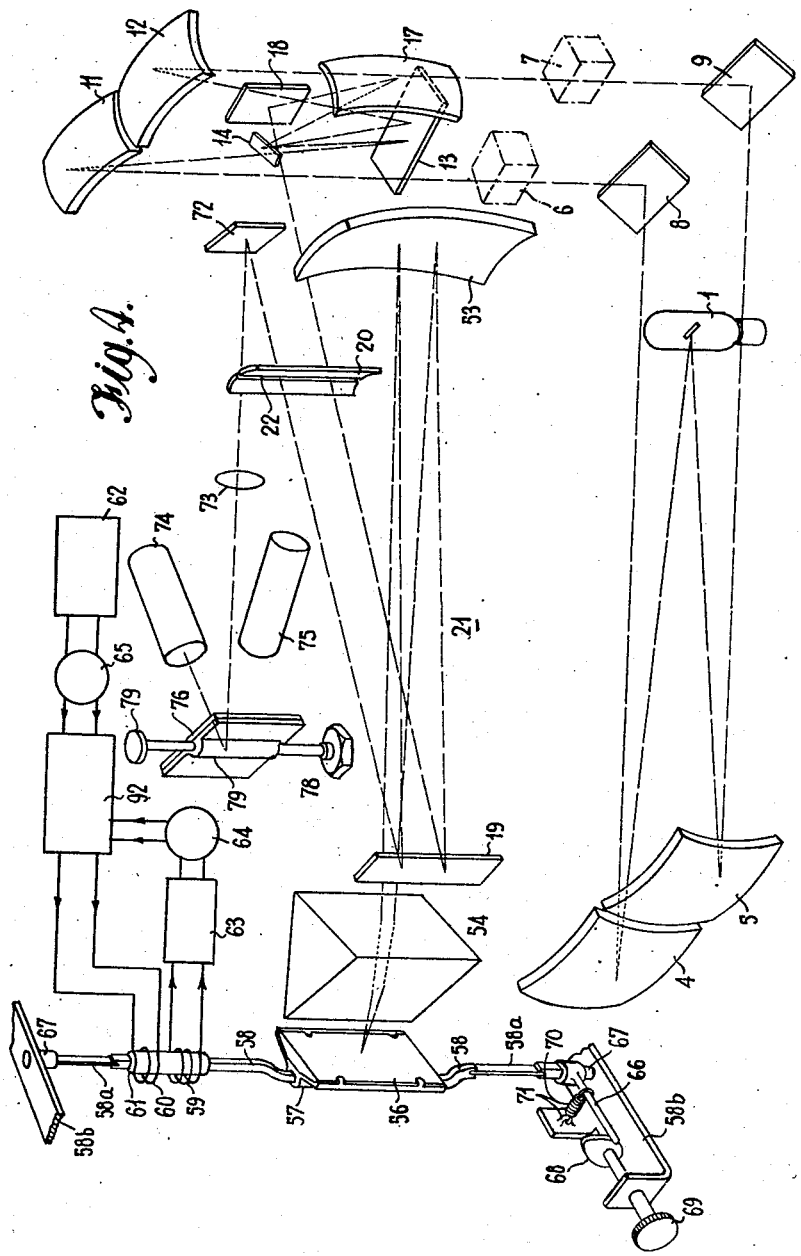
Inventor
Edgar Frank Daly
By
Emery Holcombe & Blair
Attorney Patented Sept. 28, 1954

2,690,093

UNITED STATES PATENT OFFICE 2,690,093

APPARATUS FOR ASCERTAINING THE ABSORPTION SPECTRUM OF TRANSLUCENT FLUID SUBSTANCES

Edgar Frank Daly, Cambridge, England, assignor to Unicam Instruments Limited, Cambridge, England, a British company Application March 31, 1952, Serial No. 279,635

Claims priority, application Great Britain April 6, 1951

8 Claims. (Cl. 88—14)

The present invention relates to apparatus for ascertaining the absorption spectrum of a translucent fluid substance.

The absorption spectrum of a substance is generally defined as the curve connecting values representing the percentage of light absorbed by the substance with values representing the wavelength of the light utilised, and is often considered to be the most characteristic property of a substance. For this reason, absorption spectra are frequently used in the analysis of mixtures either by plotting out the complete spectrum and making measurements upon it or by making more direct measurements of transmission at a few wavelengths at which characteristic absorptions occur.

When several substances, each having a complicated absorption spectrum, occur together in a mixture, their characteristic absorptions may, to some extent, overlap and thus make difficult the interpretation of any measurement of the absorption that is effected. In such a case, a suitable procedure consists in preparing a reference mixture of the substances concerned which has a spectrum agreeing exactly with that of the unknown mixture and it is the more specific object of the present invention to make this procedure effective.

One object of the present invention is to provide apparatus for testing a translucent fluid substance in order to ascertain its absorption spectrum in which means are provided for comparing together the absorption spectra of a test specimen and a reference specimen that has known constituents, said means comprising an arrangement for deriving indications representing the absorption spectra of the two specimens, means for continuously comparing said indications together, and means for controllably varying the composition of the reference specimen until the said indications indicate that the two specimens are matched, whereby the absorption spectrum of the test specimen may be ascertained by observation of the variations made to the reference specimen to effect matching.

Another object of the invention is to provide apparatus for testing a translucent fluid substance in order to ascertain its absorption spectrum, comprising means for illuminating a test specimen, means for illuminating a reference specimen that has known constituents, means for receiving the light that has passed through the specimens, means for transforming said received light into electrical quantities, means for alternately displaying the said electrical quantities at a high frequency on electric display apparatus, whereby a display is afforded of the differences in the absorption spectra of the two specimens, and means for controllably varying the constituents of the known reference specimen until such time as the difference between the electrical quantities displayed is zero.

Yet another object of the invention is to provide apparatus for testing a translucent fluid substance for ascertaining its absorption spectrum, comprising a source of light, means for focussing the light at two points at one of which is placed a translucent fluid substance having a known composition and at the other of which is placed the translucent fluid under test, means for scanning in wavelength the light from the two substances, means for producing an electrical signal corresponding to a difference in composition between the two substances, and means for giving visual display of said signal to afford a visual display of any difference in composition of the two substances.

Hitherto, in the analysis of a liquid or gaseous mixture containing a plurality of components, for example, a series of hydrocarbons, by infra-red spectroscopic analysis, a common procedure is the measurement of percentage absorption at a number of selected wave-lengths equal to the number of components in the mixture, and the solution of a similar number of linear simultaneous equations in percentage absorption. Provided that discretion is used in selecting the wavelengths at which measurements are made and that interaction between components of the mixture is negligible, an equation may be solved to yield reasonably accurate concentrations of the separate components. However, as may be well understood, analysis by this apparatus is long, cumbersome and tiresome but the method according to the present invention is rapid and accurate since the effect of each variation made to the reference specimen can be immediately observed by inspection of the cathode-ray tube.

In plotting spectra a spectrometer usually scans a range of wavelengths and the energy of the spectrum or, in some cases, the percentage transmission of the sample is recorded automatically on a chart. It is possible by using detectors, which respond very rapidly to radiation changes, to speed up scanning until a suitable portion of spectrum may be observed in a time of from one second to one hundredth of a second. This scan may then be repeated indefinitely, and by using a cathode ray tube for display will give an apparently continuous and up-to-date record of the absorption spectrum of a sample. In the present invention this fast scanning is made possible by using a photo-multiplier in the visible and ultra-violet and a photoconductive cell or other detector of rapid response in the infra-red. By using two radiation beams, one for the unknown sample and the other for a reference mixture, and by switching the radiation from one beam to the other at a high frequency it is possible to produce a spectrum which is the difference between the absorption spectra of the sample and of the reference mixture. This is convenient in practice, since it gives a more sensitive and easily interpreted indication of the difference between sample and reference mixtures when their spectra become very similar and can provide an indication of which is the stronger absorption at any wavelength.

In order that the invention may be more fully understood, reference will now be made to the accompanying drawings which show one specific embodiment of an apparatus according to it by way of non-limiting example and in which:

Fig. 1 is a schematic representation of a complete apparatus according to the invention, certain details of the actual physical apparatus employed being omitted for the sake of an easy reading of the figure.

Fig. 2 shows a detail of one of the variable-path-length absorption cells.

Fig. 3 shows an optical switching device.

Fig. 4 shows a complete optical and deflection system but omitting casings or other supporting devices.

In this specific embodiment, the apparatus comprises two portable units, one containing a double-beam optical system arranged for the passage of a beam of light through each of the two specimens, a monochromator and detector, and the other unit containing a power supply and the necessary electronic and display equipment for displaying differences in constitution of the two substances.

Referring to the drawings, a source of visible or infra-red radiation for the necessary constitution of beams of light for passage through the specimens, is shown in the form of a tungsten filament projector lamp 1 which is operated from a power supply 2 through a rectifier and smoothing arrangement 3 in order to minimize any ripple in the intensity of light emitted. The radiation from this lamp in operation is collected by two concave mirrors 4 and 5 and is brought to two foci located at the centres of two compartments 6 and 7 by mirrors 8 and 9 (see Fig. 4). Each of these compartments 6 and 7 is adapted to contain a stack of four variable-path-length absorption cells 10 in such a manner that the light beam passes vertically through them. The cells and their housing in the compartments are described in more detail with reference to Fig. 2. Compartment 6 is intended for the test-specimen cells and compartment 7 for the reference specimen cells. Cells of fixed or variable length, through which liquid may be circulated, may also be used in compartments 6 and 7.

After leaving the cell compartments 6 and 7, the two light beams are re-focussed by two further concave mirrors 11 and 12 and directed by a plane mirror 13 (see Fig. 4) to form images at the same place on another small mirror 14 mounted on a torsion bar 15 (see Fig. 3) serving, when oscillating, as an optical switch shown schematically at 16 in Fig. 1. Light reflected from this small mirror 14 of the optical switch 16 falls on a concave mirror 17 which brings it to a focus via mirror 18 (Fig. 4) at the entrance slit 20 of a monochromator schematically shown at 21 in Fig. 1 and whose exit slit is shown at 22. Mirror 19 acts to reduce the length of the light beam and thus the size of the apparatus. When the torsion bar 15 is at one extreme of its oscillation, one beam falls completely on the last-mentioned concave mirror 17, the image on the slit 20 of the monochromator 21 remaining approximately stationary during the switching.

For a better understanding, certain details of the apparatus will now be described.

The variable-path-length cells 10 are used in a vertical beam and as shown in Fig. 2 have fused silica windows 23, 24 one millimetre in thickness and giving a minimum aperture for the beam which is 20 millimetres in diameter and shown at A on the drawing. The maximum path-length, shown at B, is 5 millimetres and the headroom required by each cell is 25 millimetres so that, therefore, four such cells may be stacked within a height of 10 centimetres which has been found convenient for the height of the cell compartment. The cells are mounted on slides 25 which run in grooves 26 in the sides 27 of the compartment for easy location in the beam and they are graduated in hundredths of a millimetre. Only fragments of the sides 27 are shown in the drawing. For variation of the path-length the slides 25 are connected by a threaded annular cup 28 into which may be screwed a ring 29 which is connected to a plate 30 carrying the windows 23 by brackets 31. It will be seen that screwing the ring 29 into or out of the cup 28 will cause axial movement of plate 30 thus to vary the dimension B of the path length. For calibration of the separation of windows 23 and 24 and thus the path length B, a cover ring 32 bearing appropriate indications is screwed to the ring 29 and is adapted to engage over the wall 33 of the cup 28 as shown, the wall 33 having a suitable index mark in a visible position for operation. The relatively fixed window 24 is held in place on the cup 28 by the sealing member 34 which is so shaped as to provide a cup or reservoir 35 in the body of the cell. A screw 36, and others not shown are provided in the plate 30 bearing on the ring 29 for fine adjustment of parallelism of the windows when small path-lengths are used, the holding down screws, e. g. 37, being slackened to permit the adjustment and subsequently tightened. Filling of the cells is very simple, any surplus liquid being held within the outer cup or reservoir 35 of the compartment when the path-length is reduced. Loss of vapour from the liquid used may occur only via a separate filling aperture (not shown) or via the precision thread and may therefore be kept within reasonable limits if frequent and large adjustments in path-length are avoided.

In the near infra-red region of the spectrum for which sensitive photo-conductive cell detectors are commercially available, and in which fused silica windows have high transmission, fundamental hydrogen-stretching frequency bands may be very intense but overtones and combination tones much less so. It is preferable for analytical purposes to use a path-length of at least 1 mm. so that cell path readings may be made easily and reproducibly to better than 1%. Thus it may be desirable to use a solution in carbon tetrachloride, carbon disulphide, or other suitable solvent when fundamental absorptions are being used, and pure substances for weaker absorptions in the 1 mu to 2.5 mu region.

Referring now to Fig. 3, the optical switch unit 16 consists of a rigid frame 38 carrying the torsion bar 15 which is of steel or beryllium copper alloy, and to the centre of which is fixed a light soft iron armature 39 bearing the mirror 14 which, in this embodiment has the dimensions 2.5 x 12.5 x 0.5 mm. A yoke 40 of soft iron laminations carries two coils 41 and 42 and terminates in tapered pole pieces 43 and 44 near the ends of the armature 39 to provide driving impulses for the torsion bar 15. A multivibrator, schematically illustrated at 45, is arranged to generate a signal at the resonance frequency of the torsion bar 15 and drives a double triode, schematically illustrated at 46, in the anode circuits of which the coils 41 and 42 are connected. Attached near one end of the torsion bar 15 is a small soft iron armature 47 which completes the magnetic circuit of a polarised solenoid 48, magnetically screened from the field of the coils 41 and 42 by the screen 49. The output of the pick-up coil 50, after appropriate phase adjustment in the phase-adjusting circuit schematically illustrated at 51, is amplified by the amplifier at 52 to provide pulses which are fed to the grid of the multivibrator 45 and hence lock the driving signal to the resonance frequency of the torsion bar 15. A normal amplitude of oscillation of 7 degrees is maintained.

Referring now to Fig. 4 showing the disposition of the optical system used, a Littrow mirror arrangement is used in the monochromator 21, the exit slit 22 being set vertically above the entrance slit 20 and both being curved to the same radius. A collimating mirror 53 of focal length 50 cm. is used in this specific embodiment, with a 60 degree fused silica prism 54 of height 6 cm. and edge 6.5 cm. The scanning Littrow mirror 56 has a height of 5.5 cm. and width of 4 cm. In the scanner (shown schematically at 55 in Fig. 1), the mirror 56 is made from fused silica for rigidity, and is tapered towards the edge at 57 to reduce its moment of inertia, and is fixed to a hardened steel bar 58 to which is also attached a galvanometer-type coil having two windings 59, 60 on a conducting former 61 as shown schematically. Phosphor-bronze strip suspensions 58a are used between the two ends of the steel bar and a rigid frame 58b only part of which is shown. The magnetic field is provided by conventional galvanometer-pattern pole pieces and a powerful permanent magnet (not shown). The mechanical resonance frequency of the mirror-bar-coil assembly is about 50 C./S. Air damping is provided by the mirror 56 and electrical damping partly by the conducting coil former 61 and partly by amplification of the output of winding 59 acting as a damping coil and feedback of this signal in appropriate phase to the winding 60 acting as a driving coil. By this means the frequency response of the system may be controlled to follow the waveform of the applied driving voltage. The driving coil is driven from the circuit arrangement schematically illustrated in Fig. 4 and comprising a cathode-follower tube 92 adapted to provide a saw-tooth waveform voltage of 10 C./S. The damping signal from coil 59 is amplified in amplifier 63 and added to the output from the 10 C./S. sawtooth generator 62 as shown, to make up a composite signal fed via 92 to the driving coil 60 so that the mirror 56 follows the 10 C./S. sawtooth voltage. The gain of the damping-signal amplifier 63 is then varied by adjusting device 64 until the angular velocity of the mirror is constant over the greater portion of the scanning cycle. Two controls are provided, 65 for providing an electrical control of the amplitude of the sawtooth driving voltage applied, thus determining the wavelength range scanned, and a mechanical control of the mean angular position of the scanner mirror, determining the wavelength at which the scan starts. This latter control is schematically illustrated by a finger 66 attached to the bottom suspension 67 and contacting a cam 68 whose position may be adjusted by a control knob 69. A tension spring 70 anchored to a fixed part of the frame 58b at 71 tends to keep finger 66 on the cam 67. By increasing the scan amplitude, a large spectral region may be viewed with some loss of resolution, occasioned by the available amplifier bandwidth, or a more detailed examination may be made of a narrower spectral range which appears interesting merely by decreasing the scanner amplitude. Optical, as distinct from electrical, resolving power is controlled in the usual way by manipulating monochromator slit-width and head amplifier gain.

Light emerging from the exit slit of the monochromator is reflected by a mirror 72 and concentrated by lens 73 on either a photo-conductive cell detector 74, such as the B. T. H. type C lead sulphide cell for the 1–3 mu region, or on a photo-multiplier 75, such as the Mazda type 27M3 for the visible and ultraviolet regions. This may be effected as shown schematically by placing a movable mirror 76 in the path of the rays from lens 73. The mirror 76 is carried on a rod 77 bearing in a fixed support 78 and rotatable by knob 79. Provision may be made for a rapid change from one region to another as the light beam from the exit slit is switched on to one or other of these detectors, by appropriate switching of the head amplifier input lead.

Referring back to Fig. 1, a two-stage resistance-coupled head amplifier 80 located near the radiation detectors 74, 75 amplifies the 1500 C./S. signal corresponding to the difference between the radiation power traversing the alternative optical paths. Immediately following this amplifier is a two section tuned LC filter 81 having a Q value such that the effective bandwidth of head amplifier and filter is 300–400 C./S. about the switching frequency of 1500 C./S. The output signal from the radiation-detector consists of video pulses at the scan repetition frequency, having modulation corresponding to the mean intensity of the two beams and 1500 C./S. ripple corresponding to their difference. If the amplifier/filter system allows frequencies much lower than 1500 C./S. to pass, a differentiated version of the video modulation will appear in the output, where its presence is undesirable. It is necessary, in addition, to suppress harmonics of the optical switching frequency or to ensure that their phase relations to the fundamental remain unchanged, and for this purpose, the filter 81 described above, is used which attenuates these harmonics to negligibly small amplitude without unduly restricting the bandwidth.

After being further amplified in amplifier 82 and passed through a phasing network 83 the 1500 C./S. difference signal is applied to one Y plate 84 of a cathode-ray tube 85. A system resembling synchronous detection is employed in which a short pulse occupying a small fraction of one cycle at optical switching frequency is generated by generator 91 from the output of the optical switch pick-up coil 50 and applied to the modulating grid of the cathode ray tube shown schematically at 87 in such a way that this grid 87 is at a fixed potential during the pulse, but otherwise is at a sufficiently more negative potential for the spot to be suppressed. For good focusing under these circumstances an astigmatism control is desirable, and one may therefore be included in a control panel of the apparatus. The derived pulse has a fixed phase relationship to the switching-frequency signal from the head amplifier, and is made to occur at the point at which transmission via one optical path is at a maximum and that via the other at a minimum. Thus, if the portion of the head-amplifier signal appearing on the cathode-ray tube is above the zero signal line this indicates a higher radiation power in one beam, and if below the line a higher radiation power in the other beam. A balancing control is used in the double beam optical system by which the background energies in the two beams may be made equal.

Thus, in using the apparatus, a sample of an unknown fluid is placed in a cell 10 and inserted in the compartment 6. A known reference fluid is then placed in another cell 10 and placed in compartment 7. The scanning apparatus is then set into operation to give on the cathode ray tube 85 an indication of the differences in the absorption spectra of the two samples. This is possible because, although the instantaneous indication on the screen corresponds to the absorption spectrum of only one of the fluids, yet the frequency of switching from the sample to the reference is sufficiently high to give an apparently continuous indication of the difference between them. The composition of the fluid in reference compartment 7 may then be varied either by introducing appropriate additional fluids into the original reference cell 10 or by adding other cels 10 containing such additional fluids into the other grooves 26 of the reference compartment 7 until the difference indicated on the screen of tube 85 is zero. In cases where special accuracy is required a cell through which is circulated a reference mixture of variable composition may be used in place of a number of variable path-length cells containing the reference components.

In the electronic section of the apparatus the circuits are arranged for convenience in four plug-in units, in addition to transformers, control panel and a distribution panel which also carries the cathode-ray tube. Two of the units are power supplies, one being H. T. supply having two hard-valve-stabilised outputs each of +400 volts, and the other an ultra high-tension unit providing −1250 volts for the cathode-ray tube and −750 volts for the photomultiplier.

A timebase unit 88 provides the sawtooth scanner drive, cathode-ray tube X deflection voltage for X plates 89, 90 and flyback suppression signal. In this timebase unit 88 pulses generated from the 50 C./S. mains are used to lock a multivibrator at 10 C./S. A differentiated pulse from this is used to operate a very simple diode saw-tooth generator the output from which is then used to feed the scanner 55 at low impedance, and to drive a paraphase amplifier connected to the cathode-ray tube X plates. The sawtooth waveform is also differentiated and amplified to provide a brightening pulse which permits the scanner flyback and the initial distorted portion of the scan to be suppressed. Controls for scanner-damping feedback and multi-vibrator frequency are incorporated in the timebase unit 88.

In the optical switch control unit are driving and synchronising circuits for the switch, as described above, a two-stage amplifier and phasing network for the difference signal from the head amplifier and a circuit generating synchronised pulses for the phase-sensitive indicating system already described. An optical switch pick-up voltage-gain control is located in this unit, the 1500 C./S. multivibrator frequency control and Y plate astigmatism control on a panel of the electronic unit and an optical switch amplitude control on a panel of the optical unit.

In an apparatus of this type it is desirable that the operation of the whole instrument may be checked rapidly and any defect identified. For this purpose there is provided an internal monitoring system, using the display cathode-ray tube, which permits waveforms at some 30 points to be observed by the use of selector switches. A meter, also for monitoring, is located in the control panel, with a selector switch allowing a number of voltages and currents to be quickly examined.

Some factors affecting the performance of the instrument may now be examined. It appears that the quality of the detector in terms of signal-to-noise ratio and time constant will determine the success with which high resolution or very high signal-to-noise measurements can be carried out. For work on liquids in the 1–3 mu infra-red region, where radiation sources are relatively efficient, detectors of short time constant (100–500 microseconds) and modest signal-to-noise performance appears to be adequate. The importance of detector time-constant may be exemplified as follows. For a cathode-ray tube picture which is to appear steady, some minimum value must be set for the scan repetition frequency. Any increase in this will involve a decrease in the ratio of optical-switching frequency to scan-repetition frequency. The optical-switching frequency will, of course, be set at the maximum value appropriate to the detector time-constant. It is desirable that several switching cycles should occur while the monochromator scans across one absorption band, and it is therefore permissible to use an amplifier bandwith ⅕ or 1/10 of the optical switching frequency. This bandwidth will determine the noise level, and from this point of view should be narrow, while it will also control the electrical resolution of the spectrum and hence should be at least ten times the scan repetition frequency. The compromise reached in the specific embodiment of the invention is Scan repetition frequency 10 C./S. (minimum for steady picture).
Amplifier/filter bandwidth 300 C./S.
Optical switch frequency 1500 C./S. (maximum for PbS cell used).

This assumes that the detector time-constant will be shorter than 500 microseconds but may not necessarily be shorter than 100 microseconds.

For the purpose of matching samples it is not essential that the observed spectra should be without distortion, but it is desirable that as much detail as possible should be reproduced. It may be permissible in many cases, therefore, to scan a rather greater wavelength range than can be observed under good electrical resolution.

It is clear that for matching samples to within 1% absorption a peak-to-peak signal-to-noise ratio of 100 or greater is required. Assuming that this is obtained it is important to examine whether any systematic error may then interfere with the accuracy of the matching procedure. The first step in matching consists in balancing the background energies. For example, if two liquid mixtures are to be compared in the 2-3 mu region the cells 6, 7 may first be filled with some transparent liquid such as carbon tetrachloride, set at the same path-length, and the difference spectrum reduced to zero by varying the beam balancing control. If the liquids under examination are then introduced into the cells any unbalance will indicate difference in absorption and the composition of the reference mixture may be adjusted until balance is obtained.

It is obvious that perfect balancing of background energy and then of sample absorption may be attained for a single wavelength. In order that it may be attained over a large wavelength range certain optical conditions must be fulfilled. These are (i) that the distribution of light at the monochromator entrance slit 20 should be similar for both beams and (ii) that the distribution of light at the collimator 53 should be equivalent for both beams. In the apparatus according to the invention, symmetry is preserved between the two beams as they pass through the monochromator 21. Since both beams are brought to a focus in the same place at the optical switch mirror 14, no displacement of the image occurs at the monochromator entrance slit 20 as the optical switch 16 oscillates. The two mirrors throwing light on the monochromator entrance slit may be considered as a single illuminated area divided into two equal sections. When the optical switch is in its rest position the dividing line between these two sections may be considered to be in line with the mid-height of the slit and of the collimator mirror 53, prism 54 and scanner mirror 56. As the optical switch 16 oscillates about its mean position the dividing line between the two portions illuminated by the different beams oscillates above and below the mid-height of the collimator. It will be seen that on a time average more light from one beam will pass through the bottom half of the prism and more from other beam through the top half, this difference decreasing as the amplitude of oscillation of the optical switch increases. Thus reasonable symmetry about a horizontal axis is called for in the optical quality of the prism, collimator and scanner mirror, and in the illumination of the collimator by the two beams.

The double beam optical system restricts unsymmetrical distortion of the image due to coma to a direction parallel to the monochromator slit. When this is done the horizontal distribution of light across the prism face 54 is fairly uniform for both beams. Uniformity of the light patterns at the prism in the vertical direction is improved by the normal spreading of the beam parallel to the slit length. Attention must be paid to the optical quality of the absorption cell windows 23, 24 and from this point of view fused silica is found to be satisfactory. It appears that balancing over a large frequency range (i. e. 2-3 mu) may normally be attained within 1%, or with higher precision if particular care is taken over optical adjustments and the state of mirrors and windows, or if the range scanned is reduced. It may be noted that direct substitution of test for reference specimen cell might be made in one beam, the spectral comparison being in each case with a third mixture in the other beam. This technique would eliminate instrumental errors other than those dependent on the optical quality and cleanliness of the cells.

Some mention may now be made of possible modifications to the apparatus for particular purposes. Its use for the examination of liquids in the near infrared region has been discussed. Its application to gas analysis appears quite practicable, as also its use for liquids in the visible and ultra-violet region for which suitable short time-constant detectors are commercially available. Extension of the spectral range to the whole of the infra-red rocksalt region might be attained either by reduction of the scan repetition rate and the use of an afterglow C. R. T. screen or conversion to a video type of display in which the spectra of the two beams are presented on alternate scans, since non-selective detectors of very short time constant and high signal-to-noise ratio are difficult to make. An instrument modified for the rocksalt region would therefore require an optical switch either at a frequency of a few hundred cycles/second, or else synchronised with the scanner, a non-selective detector of suitable time constant, such as helium-filled Golay cell, together with an appropriate amplifier. It would have to contend with the lower signal-to-noise available from non-selective detectors, the rapid decrease in source energy with wavelength, the necessity for using optical materials less convenient than fused silica and the disadvantage either of a slow scan repetition rate or of displaying the complete energy spectra in place of the null indication already described; but it might nevertheless be justifiable where analyses could be performed only on fundamental absorption and not on over-tone bands.

A modification to the apparatus is that of automatic balancing of the spectra by servo-mechanism control of variable-path absorption cells. To apply this technique in cases where appreciable interaction between mixture components occurs it may be necessary to use both unknown and known components in solution in some transparent solvent, or to use combinations of components rather than pure components in a set of variable cells.

What I claim is:

1. Apparatus for determining the absorption spectrum of a substance comprising a first chamber, means for locating said substance in said chamber, a second chamber, a plurality of receptacle cells containing reference substances, means for locating said receptacle cells at will in number and position in said second chamber, means for passing beams of light through said chambers and through said substances located therein, means for passing said beams to a common optical light switch, means for vibrating said light switch to pass said beams alternately to a monochromator device having an entrance slit and an exit slit, a photo-cell located in the path of light rays from said exit slit so that said photo-cell has differences in output produced by the change-over of the beam effected by said light switch, means for effecting a sweep movement of said monochromator device through a desired portion of the spectrum, a cathode ray tube having two sets of electrodes, means for supplying to one set of said electrodes a voltage corresponding to said sweep movement, and means for supplying to the other set of said electrodes voltage pulses corresponding to said changes in voltage output of said photo-electric cell whereby said cathode ray tube is caused to display a signal representing in sign and magnitude the difference in the absorption spectra of the substances in said chambers.

2. Apparatus for the quantitative comparison of the absorption spectra of two substances by giving an indication of the difference in absorption of the two substances, comprising a light source, means for dividing the light from said source into two beams, a chamber in the path of each of said beams, means for locating a substance to be tested in one of said chambers, means for locating a reference standard substance in the other of said chambers, an optical light switch also located in the path of said beams after said chambers, means for moving said optical light switch at a high frequency to pass said beams alternately through a dispersion device that selects a monochromatic portion of the light, an exit slit in said dispersion device, a photo-cell located so as to receive the light emitted from said exit slit, said photo-cell thus being alternately exposed to the said two beams of light passing through the two substances, means for effecting a sweep movement of the said dispersion device across a range of the spectrum, a cathode ray oscilloscope tube including a screen, an electron-beam generator for focussing a beam of electrons on to said screen, and two sets of deflector electrodes for influencing said beam to form a trace on said screen, means for supplying a saw-tooth voltage corresponding to the said sweep movement of said dispersion device to one set of said deflector electrodes, and means for supplying voltage pulses corresponding to the differences in photo-cell output produced by the change-over from the beam passing through one of the substances to the beam passing through the other of the substances, to the second set of said deflector electrodes, and selecting means causing an indication to be produced as a trace on said screen only by the change-over from a predetermined one of the said two substances to the other and not by the reverse change-over, said sweep movement being effected periodically at a frequency sufficiently high to result in a display on the screen of said cathode ray tube which appears substantially steady and the frequency of said change-over being sufficiently high compared with said sweep frequency to produce a substantially continuous indication curve.

3. Apparatus for the quantitative comparison of the absorption spectra of two substances by giving an indication of the difference in absorption of the two substances, comprising a light source, means for dividing the light from said source into two beams, a chamber in the path of each of said beams, means for locating a substance to be tested in one of said chambers, means for locating a reference standard substance in the other of said chambers, an optical light switch also located in the path of said beams after said chambers, means for moving said optical light switch at a high frequency to pass said beams alternately through a dispersion device that selects a monochromatic portion of the light, an exit slit in said dispersion device, a photo-cell located so as to receive the light emitted from said exit slit, said photo-cell thus being alternately exposed to the said two beams of light passing through the two substances, means for effecting a sweep movement of the said dispersion device across a range of the spectrum, a cathode ray oscilloscope tube including a screen, an electron-beam generator for focussing a beam of electrons on to said screen, and two sets of deflector electrodes for influencing said beam to form a trace on said screen, means for supplying a saw-tooth voltage corresponding to the said sweep movement of said dispersion device to one set of said deflector electrodes, and means for supplying voltage pulses corresponding to the differences in photo-cell output produced by the change-over from the beam passing through one of the substances to the beam passing through the other of the substances to the second set of said deflector electrodes, said sweep movement being effected periodically at a frequency sufficiently high to result in a display on said screen of said cathode ray tube which appears substantially steady and the frequency of said change-over being sufficiently high compared with said sweep frequency to produce a substantially continuous indication curve on said screen, and selecting means causing an indication to be produced as a trace on said screen only by the change-over from a predetermined one of the said two substances to the other and not by the reverse change-over, by means for supplying from said selecting means a beam-suppressing pulse to a control grid of said cathode-ray tube during the reverse change-over.

4. Apparatus as claimed in claim 2, comprising further a filter circuit interposed between said photo-cell and said second set of deflector electrodes of said cathode ray tube, said filter passing a frequency band including said change-over frequency.

5. Apparatus for determining the composition of a mixture by its absorption spectrum by giving an indication of the difference in absorption of two substances one of which is a reference standard and the other is said mixture, comprising a light source, means for dividing the light from said source into two beams, means for locating a plurality of receptacle cells for the different components of a reference mixture in one of said chambers, means for locating a receptacle cell containing the mixture under test in the other of said chambers, an optical light switch also located in the path of said beams after said chambers, means for moving said optical light switch at a high frequency to pass said beams alternately through a dispersion device that selects a monochromatic portion of the light, an exit slit in said dispersion device, a photo-cell located so as to receive the light emitted from said exit slit, said photo-cell thus being alternately exposed to the said two beams of light passing through the two substances, means for effecting a sweep movement of the said dispersion device across a range of the spectrum, a cathode ray oscilloscope tube including a screen, an electron-beam generator for focussing a beam of electrons on to said screen, and two sets of deflector electrodes for influencing said beam to form a trace on said screen, means for supplying a saw-tooth voltage corresponding to the said sweep movement of said dispersion device to one set of said deflector electrodes, and means for supplying voltage pulses corresponding to the differences in photo-cell output produced by the change-over from the beam passing through one of the substances to the beam passing through the other of the substances to the second set of said deflector electrodes, selecting means causing an indication to be produced as a trace on said screen only by the change-over from a predetermined one of the said two substances to the other and not by the reverse change-over, said sweep movement being effected periodically at a frequency sufficiently high to result in a display on said screen which appears substantially steady and the frequency of said change-over being sufficiently high compared with said sweep frequency to produce a substantially continuous indication curve on said screen, said receptacle cells in said first-mentioned chamber being changeable for others of known content whereby controlled changes may be effected in the composition of the known mixture until a zero difference indication is given on said screen of said cathode ray tube.

6. Apparatus as claimed in claim 5, in which the receptacle cells for the known mixture include means for varying the thickness of the layer of liquid contained therein, thus to vary the path length of the light through said cell.

7. Apparatus for testing a translucent fluid substance for ascertaining its absorption spectrum by giving an indication of the difference in absorption of two substances, comprising a common light source, means for dividing the light from said light source into two beams, a chamber in the path of each of said beams, means for locating a specimen of known composition in one of said chambers, means for locating a specimen to be tested in the other of said chambers, a monochromatic separating device having an entrance slit and an exit slit, means for causing said two light beams to fall in periodic alternation upon a photo-electric cell, means for actuating said separating device periodically to sweep through a desired portion of the spectrum, a cathode ray oscilloscope tube including a screen, an electron-beam generator for focussing a beam of electrons on to said screen, and two sets of deflector plates for influencing said beam to form a trace on said screen, means for applying the periodic variations in the output of the photo-electric cell due to the alternation of the beams to one of said sets of deflector electrodes, means for supplying a sweep voltage synchronous with the periodic sweep of said separating device to the other set of said deflecting electrodes, the rate of said periodic alternation being large compared with the rate of the periodic sweep of said separating device, and means for periodically blanking the electron beam of said cathode ray tube in such synchronous relation to the periodic alternation of the two beams that said cathode ray beam will produce an indication as a trace on the said screen during the positive pulses of the periodic variations in output of said photo-electric cell when the light falling through one of the specimens has greater intensity.

8. Apparatus for testing a translucent fluid substance for ascertaining its absorption spectrum by giving an indication of the difference in absorption of two substances, comprising a common light source, means for dividing the light from said light source into two beams, a chamber in the path of each of said beams, means for locating a plurality of receptacle cells for the different components of a reference mixture in one of said chambers, means for locating a receptacle cell containing the mixture to be tested in the other of said chambers, a monochromatic separating device having an entrance slit and an exit slit, means for causing said two light beams to fall in periodic alternation upon a photo-electric cell, means for actuating said separating device periodically to sweep through a desired portion of the spectrum, a cathode ray oscilloscope tube including a screen, an electron-beam generator for focussing a beam of electrons on to said screen, and two sets of deflector plates for influencing said beam to form a trace on said screen, means for applying the periodic variations in the output of the photo-electric cell due to the alternation of the beams to one of said sets of deflector electrodes, means for supplying a sweep voltage synchronous with the periodic sweep of said separating device to the other set of said deflecting electrodes, the rate of said periodic alternation being large compared with the rate of the periodic sweep of said separating device, and means for periodically blanking the electron beam of said cathode ray tube in such synchronous relation to the periodic alternation of the two beams that said cathode ray beam will produce an indication as a trace on the said screen during the positive pulses of the periodic variations in output of said photo-electric cell when the light falling through one of the specimens has greater intensity, said receptacle cells in said first-mentioned chamber being changeable for others of known content whereby controlled changes may be effected in the composition of the known mixture until a zero difference trace indication is given on said screen of said cathode ray tube.

References Cited in the file of this patent

UNITED STATES PATENTS

| Number | Name | Date |
|---|---|---|
| 1,746,525 | Darrah | Feb. 11, 1930 |
| 2,063,140 | Allison | Dec. 8, 1936 |
| 2,066,934 | Gulliksen | Jan. 5, 1937 |
| 2,437,323 | Heigl et al. | Mar. 9, 1948 |
| 2,444,560 | Feldt et al. | July 6, 1948 |
| 2,605,671 | Canada | Aug. 5, 1952 |
| 2,613,572 | Mathieu | Oct. 14, 1952 |